(12) United States Patent
Renaud (10) Patent No.: US 9,164,189 B2
(45) Date of Patent: Oct. 20, 2015

(54) METHOD FOR MANAGING A MULTI-VESSEL SEISMIC SYSTEM

(71) Applicant: SERCEL, Carquefou (FR)

(72) Inventor: Didier Renaud, Nantes (FR)

(73) Assignee: SERCEL, Carquefou (FR)

(*) Notice: Subject to any disclaimer, the term of this patent is extended or adjusted under 35 U.S.C. 154(b) by 377 days.

(21) Appl. No.: 13/870,601

(22) Filed: Apr. 25, 2013

(65) Prior Publication Data

US 2013/0286776 A1 Oct. 31, 2013

(30) Foreign Application Priority Data

Apr. 27, 2012 (EP) ...................................... 12305482

(51) Int. Cl.
*G01V 1/38* (2006.01)
*G01V 1/26* (2006.01)
*G01V 1/22* (2006.01)

(52) U.S. Cl.
CPC .............. *G01V 1/3808* (2013.01); *G01V 1/223* (2013.01); *G01V 1/26* (2013.01); *G01V 2200/14* (2013.01)

(58) Field of Classification Search
CPC ........................................................ G01V 1/26
USPC ............................................. 701/21; 700/248
See application file for complete search history.

(56) References Cited

U.S. PATENT DOCUMENTS

| | | | |
|---|---|---|---|
| 3,277,431 A * | 10/1966 | Kermode ....................... 340/852 |
| 3,281,775 A * | 10/1966 | Ritter ............................... 367/55 |
| 3,946,357 A | 3/1976 | Weinstein et al. |
| 4,365,320 A * | 12/1982 | Beauducel et al. .............. 367/21 |
| 4,493,063 A | 1/1985 | Tims et al. |
| 4,532,617 A * | 7/1985 | Baecker et al. .................. 367/19 |
| 5,548,562 A * | 8/1996 | Helgerud et al. ................ 367/14 |
| 5,650,981 A * | 7/1997 | Jacobsen et al. ................ 367/19 |
| 5,978,313 A * | 11/1999 | Longaker ......................... 367/38 |
| 8,175,765 B2 * | 5/2012 | Holo et al. ........................ 701/21 |
| 8,473,175 B2 * | 6/2013 | Holo et al. ........................ 701/93 |
| 2003/0012083 A1* | 1/2003 | Brunet .............................. 367/19 |
| 2003/0117893 A1* | 6/2003 | Bary ................................ 367/16 |
| 2005/0052951 A1* | 3/2005 | Ray et al. ....................... 367/188 |
| 2008/0021658 A1 | 1/2008 | Pavel et al. |
| 2009/0157242 A1* | 6/2009 | Holo et al. ........................ 701/21 |
| 2010/0235098 A1* | 9/2010 | Hovstein ........................ 701/300 |

(Continued)

OTHER PUBLICATIONS

European Search Report and Written Opinion dated Oct. 17, 2012 for corresponding European Patent Application No. 12305482.7 filed Apr. 27, 2012, 7 pages.

*Primary Examiner* — Ari M Diacou
(74) *Attorney, Agent, or Firm* — David D. Brush; Westman, Champlin & Koehler, P.A.

(57) ABSTRACT

A method for managing a multi-vessel seismic system including a first vessel, having a recording system and towing a streamer integrating seismic sensors, and a second vessel, including at least one seismic source performing shots. The second vessel sends to the first vessel a plurality of series of shot predictions. For each shot, the second vessels activates the seismic source according to the predictions and sends to the first vessel shot data relating to the shot. The first vessel activates the recording system. If the first vessel has not received the shot data relating to at least one performed shot, it sends a request to the second vessel and receives in response the missing shot data. For each performed shot and the related shot data, the system selects seismic data and combines the selected seismic data with the related shot data to obtain combined data allowing a seabed representation.

11 Claims, 5 Drawing Sheets

(56) References Cited

U.S. PATENT DOCUMENTS

2012/0008459 A1* 1/2012 Coste et al. .................. 367/23
2012/0221182 A1* 8/2012 Holo et al. .................. 701/21
2014/0146638 A1* 5/2014 Renaud .......................... 367/15
2014/0269182 A1* 9/2014 Parkes et al. .................. 367/24
2014/0372044 A1* 12/2014 Jiao et al. ...................... 702/16

* cited by examiner

METHOD FOR MANAGING A MULTI-VESSEL SEISMIC SYSTEM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The field of the invention is that of geophysical data acquisition.

More precisely, the invention relates to marine seismic acquisition involving several vessels to achieve an imaging of the seabed earth crust.

In particular, the invention relates to a method for managing a multi-vessel seismic system comprising a first vessel (also called "listener vessel"), having a recording system and towing at least one streamer integrating seismic sensors, and a second vessel (also called "shooter vessel"), comprising at least one seismic source performing shots at determined instants. This method comprises a step of recording, by the recording system, seismic data obtained by the seismic sensors, and a step of combining the recorded seismic data (first file) with shot data relating to the shots (second file), to obtain combined data (third file) whose interpretation allows to obtain a seabed representation.

In practice, a multi-vessel seismic system often comprises more than two vessels, with for example several shooter vessels and several listener vessels. Moreover, some vessels can be both a shooter vessel and a listener vessel. However, we consider below only the simple case of a couple of vessels including a shooter vessel and a listener vessel. Indeed, any complex multi-vessel system can be decomposed into a plurality of simple cases of the aforementioned type because:
- although there are several shooter vessels, one can shoot at the same time;
- although there are several listeners vessels, each one behaves the same way with regard to the shooter vessel;
- even if a vessel can behave as both a shooter vessel and a listener vessel, it can have only one behaviour at a time.

The present invention can be applied notably to the oil exploration industry, but may also be applied to any field using a geophysical data acquisition network in a marine environment.

TECHNOLOGICAL BACKGROUND

To perform a seismic marine acquisition in a survey area, it is common to use seismic sources (guns, vibratory sources, ... ) and seismic sensors. The sensors are housed in cables, called streamers or linear antennas. Several streamers are used together to form an array of thousands of sensors. Sources and streamers are both towed by vessels. A vessel tows generally one or more streamers and can be equipped (or not) with seismic sources.

To collect the geophysical data in the marine environment, one or several immerged seismic sources towed by at least one shooter vessel are activated to generate single pulses or continuous sweep of energy. The signals generated by each source travels through the layers of the earth crust and the reflected signals are captured by the sensors (hydrophones) in the streamers towed by at least one listener vessel.

The data collected by all sensors during a period of a few seconds (called record length) is then stored by a recording system as a dataset (usually a file in SEG-D format). The interpretation of the seismic data contained in the SEG-D files is used to compute a 3D image of the earth crust.

The theoretical position of seismic sources and seismic sensors for each acquisition is described in a specific document called "preplot": the more the preplot requirements are respected, the more the quality imaging of the earth crust is. The actual positions of all equipments (hydrophones and guns) are known thanks to well-known measure means (GPS, RGPS, acoustics, compasses, depth sensors ... ).

The acquisition process is controlled and monitored by an Integrated Navigation System (INS), whose role is to compute position of sensors and sources, drive vessels along their acquisition path, according to the preplot geometry, and to activate sources to perform seismic acquisition at desired location.

This time and space synchronization (between sources and sensors) is achieved by the exchange of space events (called bull's eye), giving position at which each vessel should be (this giving position of sensors and sources), and time events (called shots), giving time at which a source is to be activated.

To further increase the quality of seismic imaging, the seismic surveys are now performed in multi-vessel operation, in order to obtain a wide azimuth illumination of the earth's crust. In this case, an initiating pulse is transmitted via a radio modem line to the vessel or vessels participating in the survey. In multi-vessel operation, a known solution is to centralize the shooting management on a particular vessel called master vessel. For example, this master vessel tows a plurality of seismic streamers and also tows one or more seismic sources (guns for example).

All vessels position information are sent to this master vessel, which in return generates space and time events for all vessels, according to preplot. The flow of information is exchanged in real time through wireless channels, which are not 100% reliable due to fading, long distances between vessels, multipath and floating obstructions.

Figures 1, 2:
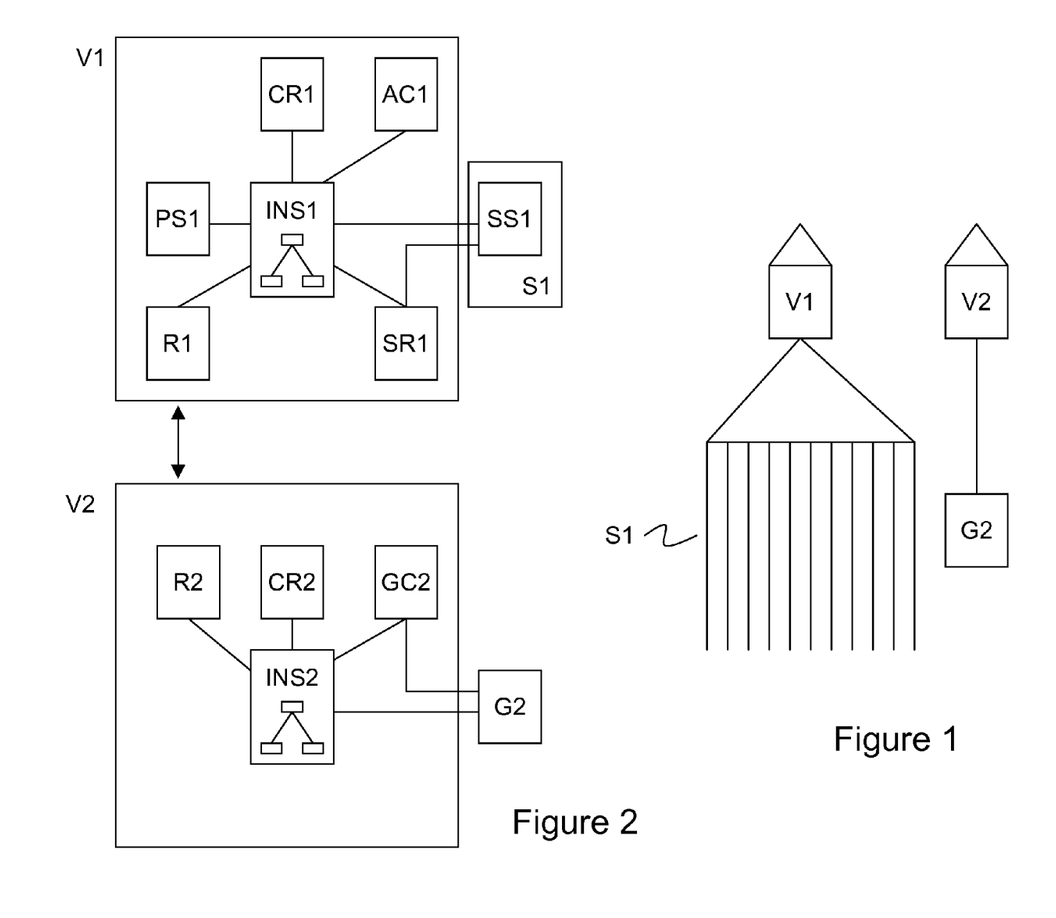
FIG. 1, already discussed in relation to the prior art, shows a simplified example of a multi-vessel seismic system, comprising a shooter vessel and a listener vessel.
FIG. 2 is a schematic illustration of the functional blocks included in the shooter vessel and the listener vessel, in a multi-vessel seismic system according to a particular embodiment of the invention.

Referring to FIG. 1, an example of such a multi-vessel marine seismic acquisition is schematically shown.

As explained above, for the sake of simplicity, we consider the simple case of a couple of vessels including a shooter vessel V2, which tows a source G2 (for example a gun), and a listener vessel V1, which tows a plurality of streamers S1. We also assume that the listener vessel V1 is the master vessel and the shooter vessel V2 is the slave vessel. The master vessel V1 is moving in parallel with the slave vessel V2. Streamers S1 include seismic signal receiving sensors (for example, hydrophones), which receive reflections of signals from source G2.

Source G2 is controlled by a source controller located on slave vessel V2. Signals received by streamers S1 are recorded onboard master vessel V1 by a seismic recorder.

It is desirable to record reflections of signals initiated by source G2 at streamers S1. For this purpose, synchronization of the recording system on the listener vessel (master vessel in this example) with the source on the shooter vessel (slave vessel in this example) is critical to accurate data acquisition. However, while a recording system on any given vessel is accurately synchronized with a source on the same vessel, precise coordination of a recording system and a source located on a listener vessel and a shooter vessel respectively has proved to be difficult.

An example of the problem occurs when the recording system on the master vessel is set to record seismic reflections from a source on a slave vessel. The master vessel transmits a shoot command to the slave vessel's seismic source. There is a small, but significant, delay between the instant when the master vessel computer issues the shoot command for the slave vessel source, and the instant when the slave vessel actually causes the shot. This delay is caused by the delay inherent in the computers, radio transmission, and receiving links between the vessels.

The instant in time when any source actually fires, and the instant when any particular reflection is received by a streamer, are termed "events" which must be synchronized. Those of skill in the art will also recognize that synchronization among and between other events is also of critical importance in multi-vessel seismic exploration. Examples of such other events include: the instant in time when a particular vessel crosses a particular point on the seabed floor, the instant in time when a seismic source on a particular vessel is initiated, etc.

According to typical systems, a VHF radio link is used to communicate the events between the two vessels (master and slave), with, for example, a phase locked loop (PLL) circuit used to detect the events communicated on the radio link. "Fire" and "time break" commands are generated across the radio link at specific instants, based upon the calculated delay, which will, hopefully, cause the recorder to begin recording at about the same instant as the firing of the source. However, such a system requires a constantly operational radio transmission link, and the system also requires regular calibration. Calibration is normally carried out "off-line," the result of which is that timing errors may occur between calibrations, these timing errors being undetected.

During seismic survey, the radio link between two vessels (or more) can be lost or down (broken), for example when the two vessels sail on both sides of a metallic barrier, such as in an offshore platform.

If radio link is lost or down at a time when a shoot command is transmitted to the slave vessel's source, the shoot command will not be received, the shot will not be made, and the vessels will pass by a spot where data is required.

Thus, such loss of wireless communication (radio link) prevents master vessel to know precisely position of other vessels and/or prevents other vessels to receive time and space events, thus making shot imprecise in time and/or space or missing. The consequence is an altered image of the earth's crust.

SUMMARY OF THE INVENTION

A particular embodiment of the invention proposes a method for managing a multi-vessel seismic system comprising a first vessel, having a recording system and towing at least one streamer integrating seismic sensors, and a second vessel, comprising at least one seismic source performing shots, seismic data obtained by said seismic sensors being recorded by said recording system, the recorded seismic data being combined with shot data relating to said shots, to obtain combined data whose interpretation allows to obtain a seabed representation, characterized in that said method comprises:
the second vessel sends to the first vessel, via a radio link, a plurality of series of shot predictions, said series being updated successively in time, each series comprising instants planned for the N next shots, with N≥2;
for each shot, the second vessel activates the at least one seismic source according to said predictions and sends to the first vessel, via said radio link, shot data relating to said shot;
the first vessel activates the recording system, in order to record seismic data, either non-continuously and according to a last received series of shot predictions, or continuously;
if, by analyzing a received series of shot predictions, the first vessel detects that it has not received the shot data relating to at least one performed shot, then the first vessel sends a request to the second vessel and receive in response the missing shot data;
for each performed shot and the related shot data, selecting seismic data as a function of said related shot data, and combining the selected seismic data with said related shot data in order to obtain said combined data.

Thus, this particular embodiment relies on a wholly novel and inventive approach, in which each of the first vessel and the second vessel is able to continue its operations (shooting operations for the second vessel and recording operations for the first vessel), even though the radio link between them is unusable (temporary loss of radio link).

Thanks to the series of shot predictions it receives (coming from the second vessel), the first vessel can detect, a posteriori, a cut of the radio link and, using a request/response mechanism, obtain from the second vessel the missing shot data (i.e. the shot data relating to the shot or shots that occurred during the lapse of time of the radio link cut).

As detailed below, during the lapse of time of the radio link cut, the first vessel continues to record the seismic data (two cases are possible: either with a non-continuous recording system or with a continuous recording system).

According to a particular feature, the shot data relating to a given performed shot comprise:
a real time of said given performed shot;
a position of said at least one seismic source which has performed said given performed shot; and
data relating to at least one gun comprised in said at least one seismic source and used to perform said given performed shot.

According to a particular feature, for each performed shot, the first vessel obtains an instant planned for said performed shot from a last received series of shot predictions, and activates at least one equipment comprised in said first vessel at an instant function of said planned instant.

Thus the first vessel is able to continue operations other than recording operation, even though the radio link between them is unusable (temporary loss of radio link). The at least one equipment is for example an acoustic controller (as detailed below).

According to a particular feature, the number N of shot predictions comprised in the series is variable and function of the speed of the second vessel.

Thus it is possible for example to keep constant the tolerated duration of a radio link cut (in this example, the number of predictions per series should increase when the speed of the second vessel increase).

According to a particular feature, the first vessel carries out said step of selecting seismic data as a function of said related shot data, and said step of combining said selected seismic data with said related shot data in order to obtain said combined data.

Thus the combined data are obtained by the first vessel, e.g. during a seismic survey. In a variant, the step of selecting and the step of combining (or only the step of combining) can be carried out outside the first vessel, e.g. after a seismic survey.

In a first implementation, said recording system is a non-continuous recording system. For each performed shot, the first vessel obtains an instant planned for said performed shot from the last received series of shot predictions, and activates said non-continuous recording system at said planned instant. For each performed shot, said step of selecting seismic data consists of selecting seismic data, recorded from said planned instant by said non-continuous recording system, as a function of a real time, comprised in said shot data, of said performed shot.

Thanks to the last series of shot predictions it has received (before the cut of the radio link), the first vessel can continue to know when to activate the non-continuous recording system.

According to a particular feature of this first implementation, for each performed shot, said step of selecting seismic data comprises the following steps:
- determining a time shift between the real time of execution by the second vessel of said performed shot and said instant planned for said performed shot, obtained by the first vessel from the last received series of shot predictions;
- selecting seismic data among seismic data recorded from said planned instant by said non-continuous recording system, as a function of the real time of said performed shot and said time shift.

Thus it is possible to compensate for the time shift which could occur, during the lapse of time of the radio link cut, between:
- updated predictions used by the second vessel to determine the times of shot (instants of activation of the source). The predictions are updated for example because the speed of the second vessel is not constant; and
- non-updated predictions (i.e. last series of predictions received before the radio link cut) used by the first vessel to determine the recording times (instants of activation of the recording system).

According to a particular feature of this first implementation, if the second vessel detects the radio link is unusable, the second vessel ceases to generate new updated series of shot predictions and performs the next shots according to a last generated series of shot predictions, until the radio link is usable again.

This allows to reduce the aforesaid time shift.

In a second implementation, said recording system is a continuous recording system using a common clock to associate time-stamp data to the recorded seismic data. The second vessel determines a real time, comprised in said shot data, of each performed shot using said common clock. For each performed shot, said step of selecting seismic data consists of selecting seismic data among recorded seismic data, as a function of the real time of said performed shot and the time-stamp data associated to the recorded seismic data.

In this second implementation, the first vessel does not use the last series of shot predictions it has received (before the cut of the radio link), to select the correct seismic data to be combined with the shot data, for each performed shot.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

In another embodiment, the invention pertains to a multi-vessel seismic system comprising a first vessel, having a recording system and towing at least one streamer integrating seismic sensors, and a second vessel, comprising at least one seismic source performing shots, seismic data obtained by said seismic sensors being recorded by said recording system, the recorded seismic data being combined with shot data relating to said shots, to obtain combined data whose interpretation allows to obtain a seabed representation:
- the second vessel is adapted to send to the first vessel, via a radio link, a plurality of series of shot predictions (TP, TP', TP"), said series being updated successively in time, each series comprising instants planned for the N next shots, with N≥2;
- the second vessel is adapted to activate, for each shot, the at least one seismic source according to said predictions, and to send to the first vessel, via said radio link, shot data (FTB, SP, GH) relating to said shot;
- the first vessel is adapted to activate the recording system, in order to record seismic data, either non-continuously and according to a last received series of shot predictions, or continuously;
- the first vessel is adapted to detect, by analyzing a received series of shot predictions, that it has not received the shot data relating to at least one performed shot;
- the first vessel is adapted to send a request to the second vessel and to receive in response the missing shot data, if the first vessel detects that it has not received the shot data relating to at least one performed shot;
- the system is adapted to select, for each performed shot and the related shot data, seismic data as a function of said related shot data, and to combine the selected seismic data with said related shot data in order to obtain said combined data.

LIST OF FIGURES

each of FIGS. 3 and 4 is a schematic representation of a seismic survey using a method according to a first embodiment of the invention, when the radio link works (FIG. 3) and is down (FIG. 4) respectively.

each of FIGS. 5 and 6 is a schematic representation of a seismic survey using a method according to a second embodiment of the invention, when the radio link works (FIG. 5) and is down (FIG. 6) respectively.

DETAILED DESCRIPTION

In the particular embodiment of FIG. 2, the multi-vessel seismic system comprises a shooter vessel V2 and a listener vessel V1.

As already explained above, for illustrative purposes, we can consider only this simple case of a couple of vessels (including a shooter vessel and a listener vessel) because any complex multi-vessel system can be decomposed into a plurality of simple cases of this type.

The shooter vessel V2 comprises:
- an integrated navigation system INS2, which determines the time of fire for each shot point of a predetermined "preplot";
- a radio communication system R2, designed to exchange data via radio link at least with listener vessel V1;
- a clock reference CR2, synchronized to the GPS time clock of the second vessel (not illustrated);
- a seismic source G2, comprising for example one or several guns;
- a gun controller GC2, able to command the seismic source G2 and generate shot data. The gun controller GC2 commands to fire the shot via a binary electrical signal sent by the integrated navigation system INS2. Each shot is fired following a change in the signal. When the shot is fired, a binary output of the gun controller GC2 is used to determine the real time of the shot (also called FTB, for "Field Time Break"). After each shot, the gun controller GC2 generates information about guns (pressure, activated guns, depth), theses information being aggregated in a "gun header" (also called GH). The gun controller GC2 provides the integrated navigation system INS2 with the shot data relating to each shot, i.e. the real time of the shot FTB and the gun header GH.

The listener vessel V1 comprises:
- an integrated navigation system INS1;
- a radio communication system R1, designed to exchange data via radio link at least with shooter vessel V2;
- a clock reference CR1, synchronized to the GPS time clock of the first vessel (not illustrated);
- a plurality of seismic sensors SS1 (e.g. hydrophones) on streamers S1;
- positioning systems PS1 (GPS, DGPS, RGPS), which allow integrated navigation system INS1 to computes all the positions of seismic sensors SS1 on streamers S1;
- an acoustic controller AC1 which controls acoustic modem and allows integrated navigation system INS1 to computes all the positions of seismic sensors SS1;
- a seismic recorder SR1, designed to record a file containing seismic data from the seismic sensors SS1 (also called "first file" later on the description). The seismic recorder SR1 is activated by a binary signal sent by the integrated navigation system INS1. The seismic recorder SR1 is supplemented by additional data (gun header GH, real time of shot FTB, positions of seismic sources SP) transmitted by the shooter vessel and collected by the integrated navigation system INS1.

When conducting seismic surveys, it is vitally important to be able to determine the exact times of events and operations and also to be able to establish the exact time relationship between the different operations. In particular, it is imperative that binary signals sent to seismic recorder SR1 of the listener vessel V1 and binary signals sent to gun controller GC2 of the shooter vessel V2 are perfectly synchronized.

After each shot, two files are created on the listener vessel V1:
- a first file containing seismic data provided by seismic sensors SS1 of seismic streamers S1; and
- a second file, called RH file (for "record header"), containing information about shots on shooter vessel V2 (gun header GH, real shot time FTB and source position SP at shot time).

These first and second files are then combined to form a complete third file (also called SEG-D file).

During one seismic survey, the integrated navigation system INS1 of the listener vessel V1 records all information about seismic sensors network: position information (obtained with GPS, DGPS or RGPS), pressure information (obtained with pressure sensors), depth information (obtained with depth sensors), information about acoustic mode, etc.) and about times of shots. These information are recorded in a LOG file (e.g. conforms to the Ukooa P294 specification) which permits to determine the positions of sensors at a specific shot time.

Then, to obtain a complete seabed representation, the SEG-D file and the LOG file are associated.

Figure 3:
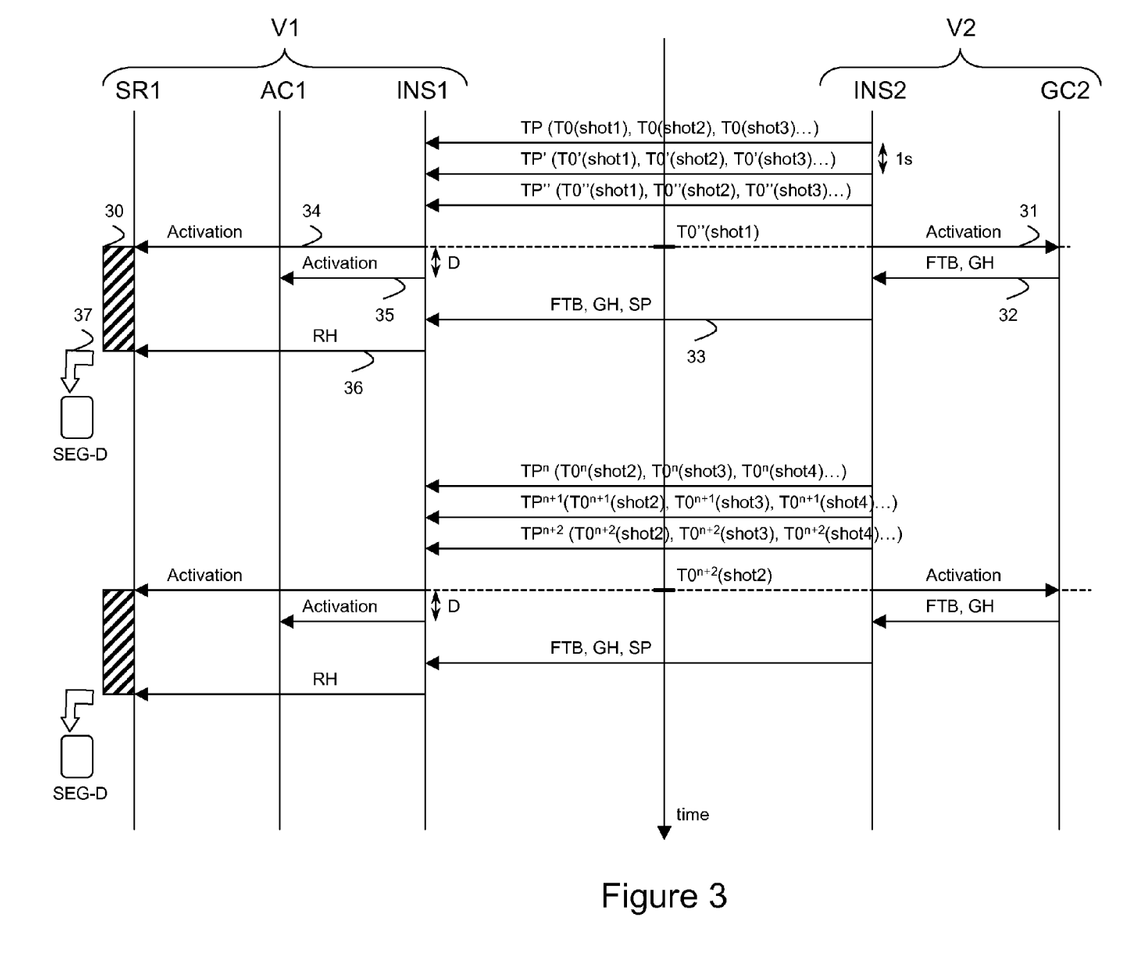
Figure 4:
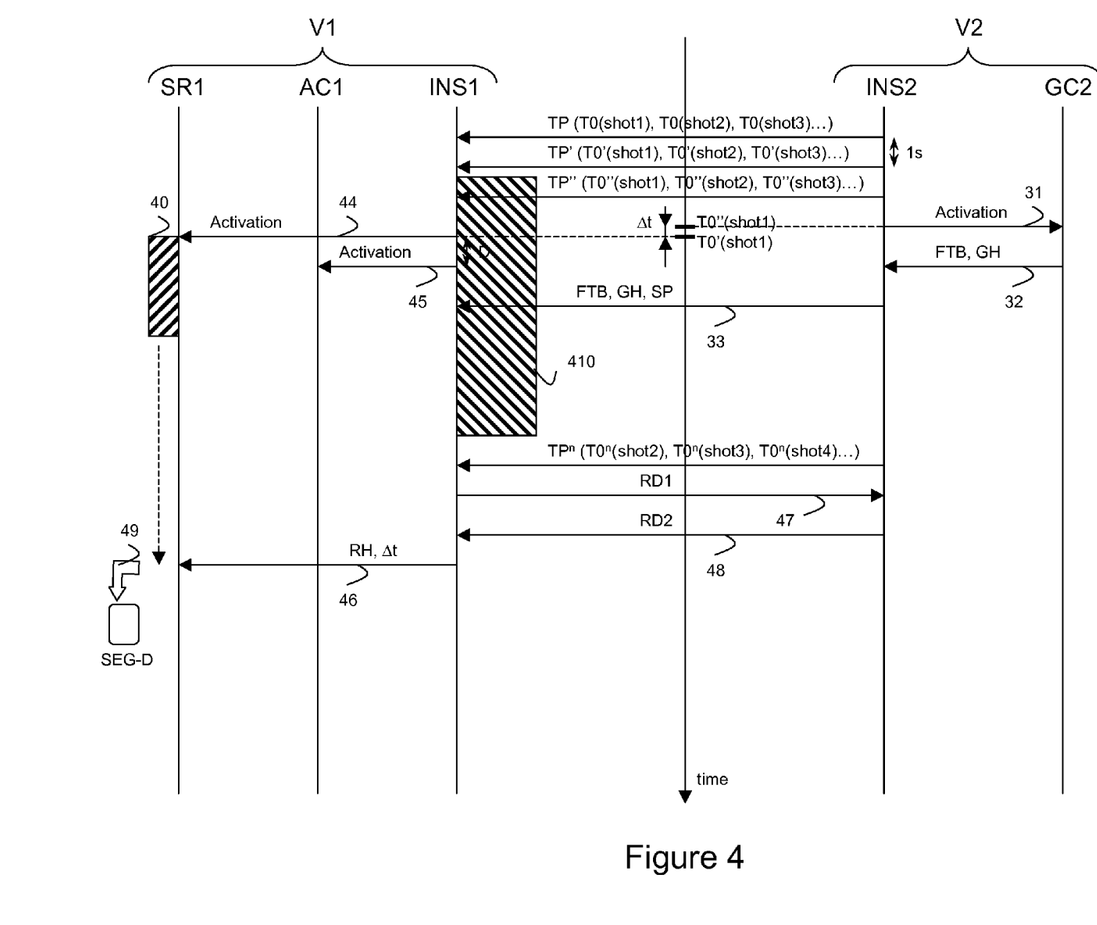

Referring now to FIGS. 3 and 4, we present a method according to a first embodiment of the invention. In FIG. 3, the radio link between the listener vessel V1 and the shooter vessel V2 works (i.e. is usable). In FIG. 4, this radio link is down (i.e. is unusable). It has to be noted that FIGS. 3 and 4 schematically illustrate a sequence of actions in a time axis.

FIG. 3 illustrates schematically the management of the shooting operation and the recording operation, performed in normal conditions (radio link is working between listener vessel V1 and shooter vessel V2) and in a non-continuous recording mode (we assume the seismic recorder SR1 is a non-continuous recording system which has to be activated, for each shot, to start the record).

We detail now the steps performed by the listener vessel V1 and the shooter vessel V2.

The shooter vessel V2, which knows its position, its speed and the preplot, computes periodically (e.g. each second) a series of shot predictions (TP, TP', TP"), comprising the instants planned for the N next shots. For example, N=30 and the successive series of shot predictions TP, TP', TP" can be noted:

TP (T0(shot1), T0(shot2), T0(shot3) . . . T0(shotN))
TP' (T0'(shot1), T0'(shot2), T0'(shot3) . . . T0'(shotN))
TP"(T0"(shot1), T0"(shot2), T0"(shot3) . . . T0"(shotN))

Each second, the shooter vessel V2 sends a new prediction series, with a timestamp (time of computation), to the listener vessel V1.

In the example of FIG. 3, we assume that finally the time of the first shot is T0"(shot1), i.e. the time given by the series noted TP". Therefore, at T0"(shot1), the integrated navigation system INS2 of the shooter vessel V2 sends an activation signal 31 to the gun controller GC2, so that the latter fires (i.e. makes the first shots). After the first shot, the gun controller GC2 provides the integrated navigation system INS2 with a message 32 containing the time of shot FTB and the gun header GH. Then, the integrated navigation system INS2 sends to the integrated navigation system INS1 of the listener vessel V1, via the radio link, a message 33 containing the data relating to the first shot, namely the time of shot FTB, the gun header GH and the source position (SP).

The listener vessel V1, which has previously received the last series of predictions TP", can take the decision to send, at T0"(shot1), an activation signal 34 to the seismic recorder SR1, so that the latter starts to record. The seismic recorder SR1 generates a first file 30, which includes seismic data coming from the seismic sensors SS1, and which are associated with time-stamp data (time tags) function of T0"(shot1).

At T0"(shot1) plus a predefined delay D (should be positive or negative), the integrated navigation system INS1 sends an activation signal 35 to the acoustic controller AC1 (to update the positions of seismic sensors) and/or any equipment required for quality control or other (such as gravimeter, magnetometer . . . ).

Besides, the integrated navigation system INS1 of the listener vessel V1 computes, and sends to the seismic recorder SR1, the record header RH file (second file), comprising the previously received data relating to the first shot (time of shot FTB, gun header GH and source position SP). This record header RH is sent to the seismic recorder SR1, in a message 36.

At the end, the seismic recorder SR1 creates (action symbolized by the arrow referenced 37) a full complete SEG-D file (third file) relating to the first shot, by combining the first file 30 and the second file (RH file).

In a variant, the combination of the first file and the second file is not carried out by the seismic recorder SR1, but by another equipment of the listener vessel V1 (e.g. during the seismic survey) or by an equipment which is not on board the listener vessel V1 (e.g. after the survey).

As illustrated in FIG. 3, after the time of the first shot (T0"(shot1)) is lapsed, a new cycle is then started (to prepare the second shot). The beginning of this new cycle corresponds to sending, by the shooter vessel V2, of a new set of successive series of predictions noted:

T"(T0"(shot2), T0"(shot3), T0"(shot4) . . . T0"(shotN))
$T^{n+1}$ ($T0^{n+1}$(shot2), $T0^{n+1}$(shot3), $T0^{n+1}$(shot4) . . . $T0^{n+1}$(shotN))
$T^{n+2}$ ($T0^{n+2}$(shot2), $T0^{n+2}$(shot3), $T0^{n+2}$(shot4) . . . $T0^{n+2}$(shotN))

In the example of FIG. 3, we assume that finally the time of the second shot is $T0^{n+2}$(shot2), i.e. the time given by the series noted $TP^{n+2}$. The other steps of this new cycle are not described again.

FIG. 4 illustrates schematically the management of the shooting operation and the recording operation, performed in unusual conditions (radio link is not working between listener vessel V1 and shooter vessel V2) and in aforesaid non-continuous recording mode.

In the example of FIG. 4, the time period during which the radio link is down is represented by the hatched area 410. In other words, we assume that the listener vessel V1 does not receive the series of shot predictions TP''' to $T^{n-1}$. The last received series before the radio link is down is TP' and the first received series after the radio link works again is TP'''.

We detail now the steps performed by the listener vessel V1 and the shooter vessel V2.

As in FIG. 3, we assume that finally the time of the first shot is T0"(shot1), i.e. the time given by the series noted TP"'. Therefore, at T0"(shot1), the integrated navigation system INS2 of the shooter vessel V2 sends an activation signal 31 to the gun controller GC2, so that the latter fires (i.e. makes the first shots). After the first shot, the gun controller GC2 provides the integrated navigation system INS2 with a message 32 containing the time of shot FTB and the gun header GH. Then, the integrated navigation system INS2 sends to the integrated navigation system INS1 of the listener vessel V1, via the radio link, a message 33 containing the data relating to the first shot, namely the time of shot FTB, the gun header GH and the source position (SP).

The listener vessel V1, knowing only the last received series of predictions TP' (and not TP"), takes the decision to send, at T0' (shot1) (and not T0"(shot1)), an activation signal 44 to the seismic recorder SR1, so that the latter starts to record. The seismic recorder SR1 generates a first file 40, which includes seismic data coming from the seismic sensors SS1, and which are associated with time-stamp data (time tags) function of T0' (shot1) (and not T0"(shot1)).

At T0' (shot1) plus a predefined delay D (should be positive or negative), the integrated navigation system INS1 sends an activation signal 45 to the acoustic controller AC1 (to update the positions of seismic sensors) and/or any equipment required for quality control or other (such as gravimeter, magnetometer . . . ).

At this stage, the integrated navigation system INS1 of the listener vessel V1 cannot compute the RH file (second file), since it has not received the message 33 comprising the data relating to the first shot (time of shot FTB, gun header GH and source position SP).

When the integrated navigation system INS1 of the listener vessel V1 receives a new series of predictions (TP''' in the example of FIG. 4), it detects that it has not received the shot data relating to the first shot. Then, the integrated navigation system INS1 sends a request RD1 (arrow 47) to the integrated navigation system INS2 of the shooter vessel V2, and receives in response a message RD2 (arrow 48) containing the missing shot data (time of shot FTB, gun header GH and source position SP) relating to the first shot.

In case several shots (and not only one as in the example of FIG. 4) have been performed during the time the radio link is down, the integrated navigation system INS2 of the shooter vessel V2 sends a message RD2 containing the missing shot data (time of shot FTB, gun header GH and source position SP) relating to all these shots.

In the example of FIG. 4, after receiving the message RD2 (arrow 48), the integrated navigation system INS1 of the listener vessel V1 computes, and sends to the seismic recorder SR1, the RH file (second file), comprising the previously received data relating to the first shot (time of shot FTB, gun header GH and source position SP). This record header RH is sent to the seismic recorder SR1, in a message 46.

At the end, the seismic recorder SR1 creates (action symbolized by the arrow referenced 49) a full complete SEG-D file (third file) relating to the first shot, by combining the first file 40 and the second file (RH file), both relating to the first shot. To perform this combination, the first file 40 (record starting at T0'(shot1)) relating to the first shot is selected by the seismic recorder SR1, as a function of the real time of the first shot (information FTB comprised in the RH file received by the seismic recorder SR1 in the message 46).

However, for the first shot (or any other shot) done during radio link is down, there is a time shift Δt between:
the real time of the first shot performed by the shooter vessel V2 (as detailed above, the integrated navigation system INS2 sends the activation signal 31 to the gun controller GC2 at T0"(shot1)); and
the instant T0' (shot1) planned for the first shot in the last series of shot predictions TP' received by the integrated navigation system INS1 of the listener vessel V1.

This shift can be approximated by: Δt=T0'(shot1)−T0" (shot1)

Because of this time shift, the first file (seismic data record) related to the first shot can be incomplete and not correct. Thus, it is necessary to perform a synchronization of the first file with the second file (both relating to the first shot), taking into account the time shift Δt. For this purpose, knowing the value of Δt, the part of the first file associated with the exact time of the first shot is extracted (selection of seismic data among seismic data recorded from T0' (shot1)). This part of the first file is combined with the second file (RH file), to build the complete third file (SEG-D file).

In a variant, the combination of the first file (or a part of it, selected in function of the time shift Δt) and the second file is not carried out by the seismic recorder SR1, but by another equipment of the listener vessel V1 (e.g. during the seismic survey) or by an equipment which is not on board the listener vessel V1 (e.g. after the survey).

According to another variant, if the shooter vessel detects the radio link is unusable, it ceases to generate new updated series of shot predictions and performs the next shots according to the last generated series of shot predictions (last before the detection the radio link is down), until the radio link is usable again. This allows to use the same predictions (if the radio link cut is detected immediately) or roughly the same (if detected after one shot has already been performed) on the listener vessel V1 and the shooter vessel V2.

According to another variant, the number N of shot predictions comprised in the series is variable and function of the speed of the shooter vessel. For example, for a given maximum duration of a radio link cut, the integrated navigation system INS2 of the shooter vessel V2 determines the number N of shot predictions in each series, as a function of the speed of the shooter vessel and as a function of the distances between the successive shot points.

Figure 5:
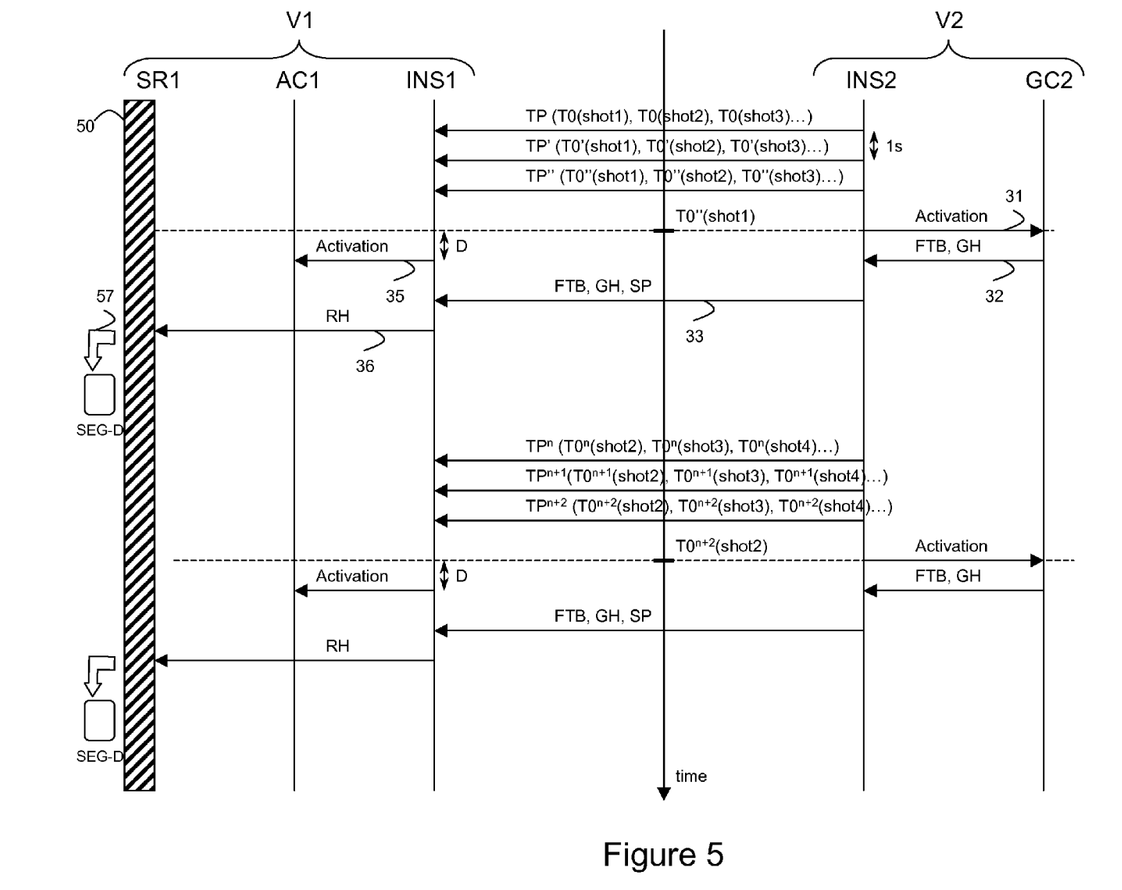
Figure 6:
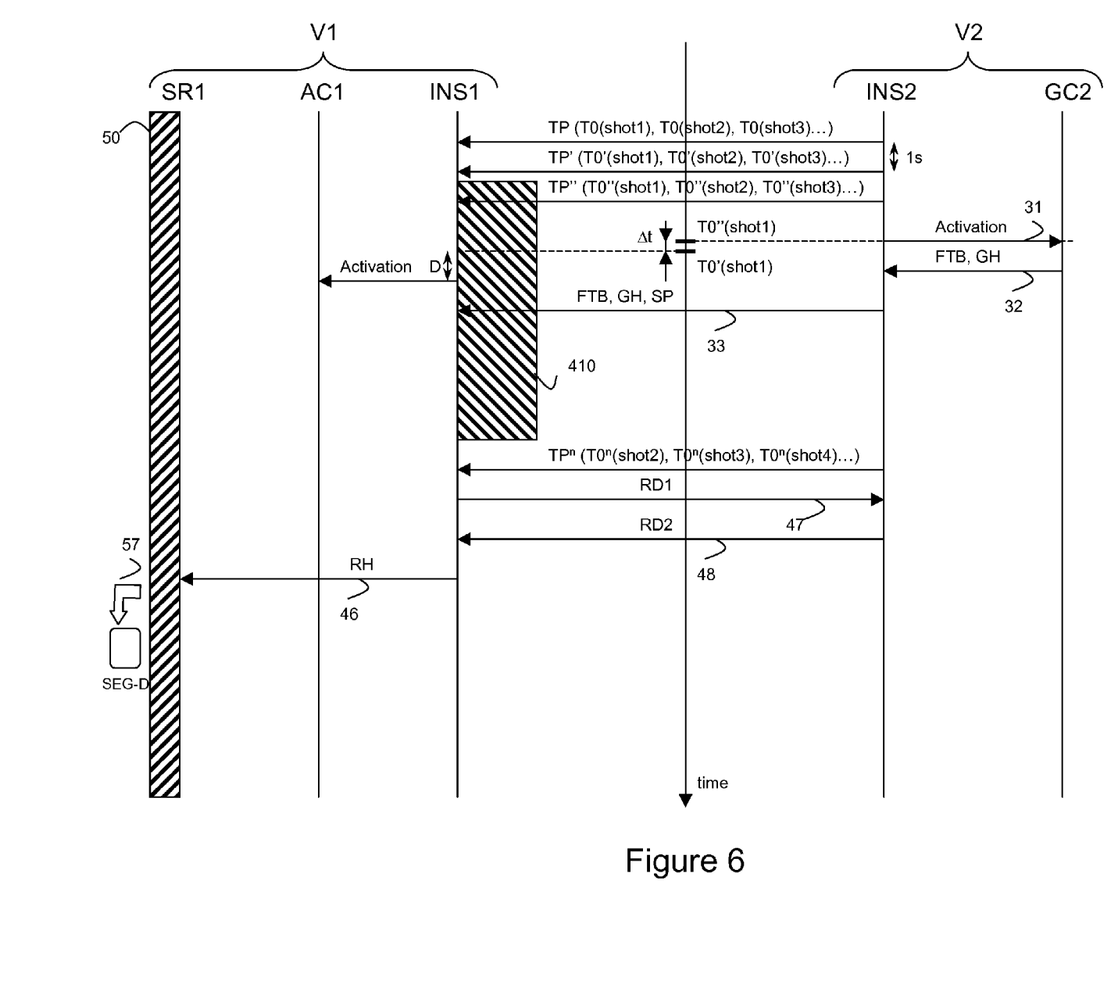

Referring now to FIGS. 5 and 6, we present a method according to a second embodiment of the invention. In FIG. 5, the radio link between the listener vessel V1 and the shooter vessel V2 works (i.e. is usable). In FIG. 6, this radio link is down (i.e. is unusable). It has to be noted that FIGS. 5 and 6 schematically illustrate a sequence of actions in a time axis.

FIG. 5 illustrates schematically the management of the shooting operation and the recording operation, performed in normal conditions (radio link is working between listener vessel V1 and shooter vessel V2) and in a continuous recording mode (we assume the seismic recorder SR1 is a continuous recording system which is activated once, i.e. has not to be activated for each shot).

We detail now the steps performed by the listener vessel V1 and the shooter vessel V2.

The shooter vessel V2 operates as in the first embodiment described above referring to FIG. 3 (for the first cycle, see the series of predictions TP, TP' and TP'' and the messages 31, 32 and 33).

The second embodiment differs from the first embodiment in the operation of the listener vessel V1, due to the fact that seismic recorder SR1 is a continuous recording system.

The seismic recorder SR1 records continuously seismic data provided by seismic sensors SS1, in a continuous global first file 50. Each seismic data or group of seismic data of this global first file 50 is associated with a time tag (time-stamp). These time tags are coming from the clock reference CR2, synchronized to the GPS time clock which is a common time base for the listener vessel V1 and the shooter vessel V2.

Besides, and as in the first embodiment of FIG. 3, the integrated navigation system INS1 of the listener vessel V1 computes, and sends to the seismic recorder SR1, the record header RH file (second file), comprising the previously received data relating to the first shot (time of shot FTB, gun header GH and source position SP). This record header RH is sent to the seismic recorder SR1, in the message 36.

Also as in the first embodiment of FIG. 3, at T0''(shot1) plus a predefined delay D (should be positive or negative), the integrated navigation system INS1 sends an activation signal 35 to the acoustic controller AC1.

The seismic recorder SR1 of the listener vessel V1 recovers continuously the real time of shots FTB, from the record header file (second file). For each real time of shot, the seismic recorder SR1 extracts (selects), from the global first file 50, the seismic data or group of seismic data associated with a time tag equal to the real time of shot FTB. Thus, the seismic recorder SR1 creates a specific record for each shot (specific first file).

Then, the seismic recorder SR1 creates (action symbolized by the arrow referenced 57), a full complete third file (SEG-D file) relating to each shot, by combining the specific first file and the second file (RH file).

In a variant, the combination of the first file and the second file is not carried out by the seismic recorder SR1, but by another equipment of the listener vessel V1 (e.g. during the seismic survey) or by an equipment which is not on board the listener vessel V1 (e.g. after the survey).

FIG. 6 illustrates schematically the management of the shooting operation and the recording operation, performed in unusual conditions (radio link is not working between listener vessel V1 and shooter vessel V2) and in a aforesaid continuous recording mode.

As in the example of FIG. 4, the time period during which the radio link is down is represented by the hatched area 410.

We detail now the steps performed by the listener vessel V1 and the shooter vessel V2.

The shooter vessel V2 operates as in the first embodiment described above referring to FIG. 5 (for the first cycle, see the series of predictions TP, TP' and TP''' and the messages 31, 32 and 33).

The second embodiment differs from the first embodiment in the operation of the listener vessel V1, due to the fact that seismic recorder SR1 is a continuous recording system.

When radio link is down, the seismic recorder SR1 of the listener vessel V1 is not able to receive real time of shots FTB coming from the shooter vessel V2 (in message 33).

As mentioned above, the listener vessel V1 is able to record continuously, in the continuous global first file 50, the seismic data with no activation coming from the shooter vessel V2. Each seismic data or group of seismic data of this global first file 50 is associated with a time tag (time-stamp) provided by the clock reference CR2, synchronized to the GPS time clock (which is a common time base for the listener vessel V1 and the shooter vessel V2).

At this stage, the integrated navigation system INS1 of the listener vessel V1 cannot compute the RH file (second file), since it has not received the message 33 comprising the data relating to the first shot (time of shot FTB, gun header GH and source position SP).

When the integrated navigation system INS1 of the listener vessel V1 receives a new series of predictions (TP''' in the example of FIG. 6), it detects that it has not received the shot data relating to the first shot. Then, the integrated navigation system INS1 sends a request RD1 (arrow 47) to the integrated navigation system INS2 of the shooter vessel V2, and receives in response a message RD2 (arrow 48) containing the missing shot data (time of shot FTB, gun header GH and source position SP) relating to the first shot.

In case several shots (and not only as in the example of FIG. 6) have been performed during the time the radio link is down, the integrated navigation system INS2 of the shooter vessel V2 sends a message RD2 containing the missing shot data (time of shot FTB, gun header GH and source position SP) relating to all these shots.

In the example of FIG. 6, after receiving the message RD2 (arrow 48), the integrated navigation system INS1 of the listener vessel V1 computes, and sends to the seismic recorder SR1, the RH file (second file), comprising the previously received data relating to the first shot (time of shot FTB, gun header GH and source position SP). This record header RH is sent to the seismic recorder SR1, in a message 46.

For shots done during radio link was down, the starting time for a seismic record (by the seismic recorder SR1) of the listener vessel V1 shouldn't be exactly the same as the shooting time on the shooter vessel V2 (true time of shots). But in this case, and contrary to the non-continuous recording mode, there is no need to perform a synchronization of data of the first file with data of the second file (with the exact time of shots). Indeed, for each real time of shot, the seismic recorder SR1 extracts (selects), from the global first file 50, the seismic data or group of seismic data associated with a time tag equal to the real time of shot FTB. Thus, the seismic recorder SR1 creates a specific record for each shot (specific first file).

Then, the seismic recorder SR1 creates (action symbolized by the arrow referenced 57) a full complete third file (SEG-D file) relating to each shot, by combining the specific first file and the second file (RH file).

In a variant, the combination of the first file and the second file is not carried out by the seismic recorder SR1, but by another equipment of the listener vessel V1 (e.g. during the seismic survey) or by an equipment which is not on board the listener vessel V1 (e.g. after the survey).

In the first and second embodiments described above, the various functional blocks performing the steps illustrated in FIGS. 3 and 4 (first embodiment) and FIGS. 5 and 6 (second embodiment) can be implemented equally well:

- by the execution of a set of computer instructions executed by a reprogrammable computing machine such as a PC type apparatus, a DSP (a digital signal processor) or a micro-controller; or else
- by a dedicated hardware machine or component such as an FPGA (Field Programmable Gate Array), an ASIC (Application-Specific Integrated Circuit) or any other hardware module.

In case the algorithm defining the method is implemented in a reprogrammable computing machine, the corresponding program (i.e. the set of instructions) can be stored in a non-transitory computer-readable carrier medium that is detachable (for example a floppy disk, a CD-ROM or a DVD-ROM) or non-detachable.

As already explained above (see FIGS. 3 to 6), in general we try to produce the third files (SEG-D files, each relating to a shot and obtained by combining the first file and the second file (RH file)), as and when shots are carried out, because management is simpler. Nevertheless, there are cases (error, processing constraint) in which production of the third file can be carried out partially and completed a posteriori (or carried out totally a posteriori). For example, for the creation of the SEGD files in the continuous recording mod (see FIGS. 5 and 6), it is possible to avoid creating a SEGD file in real-time, for each shot. In other words, we keep all data of the "global first file" 50 for an a posteriori creation of the corresponding SEGD files. This advantageously allows to take account of the physical phenomena located in front of or behind each duration (length record) associated with each shot. The process is thereby facilitated.

At least one embodiment provides a technique for managing a multi-vessel seismic system (including the shooting and recording operations), which can continue to operate with the desired precision in time and space, even in case of temporary loss of radio link between vessels.

At one embodiment provides a technique of this kind that is simple to implement and inexpensive.

At least one embodiment provides a technique of this kind that can be implemented either with a non-continuous recording system or with a continuous recording system.

Although the present disclosure has been described with reference to one or more examples, workers skilled in the art will recognize that changes may be made in form and detail without departing from the scope of the disclosure and/or the appended claims.

The invention claimed is:

1. A method for managing a multi-vessel seismic system comprising a first vessel, having a recording system and towing at least one streamer integrating seismic sensors, and a second vessel, comprising at least one seismic source performing shots, seismic data obtained by said seismic sensors being recorded by said recording system, the recorded seismic data being combined with shot data relating to said shots, to obtain combined data whose interpretation allows to obtain a seabed representation, wherein said method comprises:

the second vessel sends to the first vessel, via a radio link, a plurality of series of shot predictions, said series being updated successively in time, each series comprising instants planned for the N next shots, with N≥2;

for each shot, the second vessel activates the at least one seismic source according to said predictions and sends to the first vessel, via said radio link, shot data relating to said shot;

the first vessel activates the recording system, in order to record seismic data, either non-continuously and according to a last received series of shot predictions, or continuously;

if, by analyzing a received series of shot predictions, the first vessel detects that it has not received the shot data relating to at least one performed shot, then the first vessel sends a request to the second vessel and receives in response the missing shot data;

for each performed shot and the related shot data, selecting seismic data as a function of said related shot data, and combining the selected seismic data with said related shot data in order to obtain said combined data.

2. The method according to claim 1, wherein the shot data relating to a given performed shot comprise:

a real time of said given performed shot;

a position of said at least one seismic source which has performed said given performed shot; and data relating to at least one gun comprised in said at least one seismic source and used to perform said given performed shot.

3. The method according to claim 1, wherein, for each performed shot, the first vessel obtains an instant planned for said performed shot from a last received series of shot predictions, and activates at least one equipment comprised in said first vessel at an instant function of said planned instant.

4. The method according to claim 1, wherein the number N of shot predictions comprised in the series is variable and function of the speed of the second vessel.

5. The method according to claim 1, wherein the first vessel carries out said step of selecting seismic data as a function of said related shot data, and said step of combining said selected seismic data with said related shot data in order to obtain said combined data.

6. The method according to claim 1, wherein said recording system is a non-continuous recording system, wherein, for each performed shot, the first vessel obtains an instant planned for said performed shot from the last received series of shot predictions, and activates said non-continuous recording system at said planned instant, and wherein, for each performed shot, said step of selecting seismic data consists of selecting seismic data, recorded from said planned instant by said non-continuous recording system, as a function of a real time, comprised in said shot data, of said performed shot.

7. The method according to claim 6, wherein, for each performed shot, said step of selecting seismic data comprises the following steps:

determining a time shift between the real time of execution by the second vessel of said performed shot and said instant planned for said performed shot, obtained by the first vessel from the last received series of shot predictions;

selecting seismic data among seismic data recorded from said planned instant by said non-continuous recording system, as a function of the real time of said performed shot and said time shift.

8. The method according to claim 6, wherein, if the second vessel detects the radio link is unusable, the second vessel ceases to generate new updated series of shot predictions and performs the next shots according to a last generated series of shot predictions, until the radio link is usable again.

9. The method according to claim 1, wherein said recording system is a continuous recording system using a common clock to associate time-stamp data to the recorded seismic data,
   wherein the second vessel determines a real time, comprised in said shot data, of each performed shot using said common clock,
   and wherein, for each performed shot, said step of selecting seismic data consists of selecting seismic data among recorded seismic data, as a function of the real time of said performed shot and the time-stamp data associated to the recorded seismic data.

10. A non-transitory computer-readable carrier medium storing a program which, when executed by a computer or a processor, causes the computer or the processor to carry out a method for managing a multi-vessel seismic system comprising a first vessel, having a recording system and towing at least one streamer integrating seismic sensors, and a second vessel, comprising at least one seismic source performing shots, seismic data obtained by said seismic sensors being recorded by said recording system, the recorded seismic data being combined with shot data relating to said shots, to obtain combined data whose interpretation allows to obtain a seabed representation, said method comprising:
   the second vessel sends to the first vessel, via a radio link, a plurality of series of shot predictions, said series being updated successively in time, each series comprising instants planned for the N next shots, with N≥2;
   for each shot, the second vessel activates the at least one seismic source according to said predictions and sends to the first vessel, via said radio link, shot data relating to said shot;
   the first vessel activates the recording system, in order to record seismic data, either non-continuously and according to a last received series of shot predictions, or continuously;
   if, by analyzing a received series of shot predictions, the first vessel detects that it has not received the shot data relating to at least one performed shot, then the first vessel sends a request to the second vessel and receives in response the missing shot data;
   for each performed shot and the related shot data, selecting seismic data as a function of said related shot data, and combining the selected seismic data with said related shot data in order to obtain said combined data.

11. A multi-vessel seismic system comprising:
a first vessel, having a recording system and towing at least one streamer integrating seismic sensors, and
a second vessel, comprising at least one seismic source performing shots, seismic data obtained by said seismic sensors being recorded by said recording system, the recorded seismic data being combined with shot data relating to said shots, to obtain combined data whose interpretation allows to obtain a seabed representation, wherein:
the second vessel is configured to send to the first vessel, via a radio link, a plurality of series of shot predictions, said series being updated successively in time, each series comprising instants planned for the N next shots, with N≥2;
the second vessel is configured to activate, for each shot, the at least one seismic source according to said predictions, and to send to the first vessel, via said radio link, shot data relating to said shot;
the first vessel is configured to activate the recording system, in order to record seismic data, either non-continuously and according to a last received series of shot predictions, or continuously;
the first vessel is configured to detect, by analyzing a received series of shot predictions, that it has not received the shot data relating to at least one performed shot;
the first vessel is configured to send a request to the second vessel and to receive in response the missing shot data, if the first vessel detects that it has not received the shot data relating to at least one performed shot;
the system is configured to select, for each performed shot and the related shot data, seismic data as a function of said related shot data, and to combine the selected seismic data with said related shot data in order to obtain said combined data.

* * * * *